F. H. TUPPER.
MOLDED GEAR.
APPLICATION FILED JAN. 7, 1922.
1,424,267.
Patented Aug. 1, 1922.
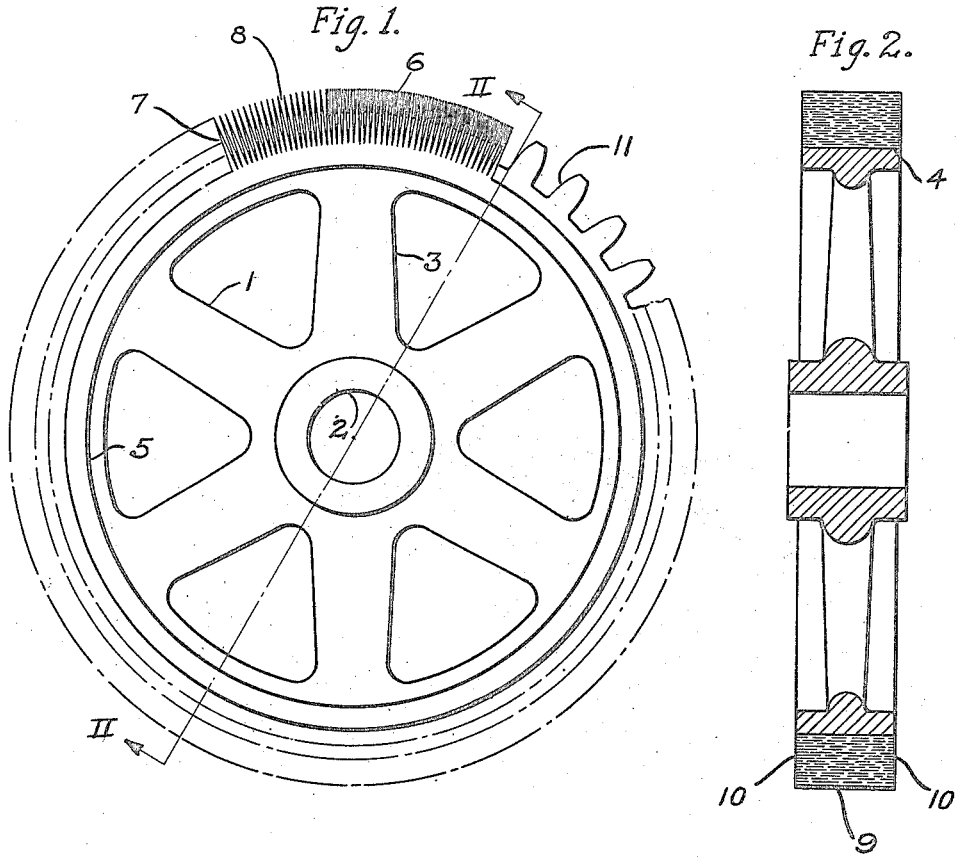
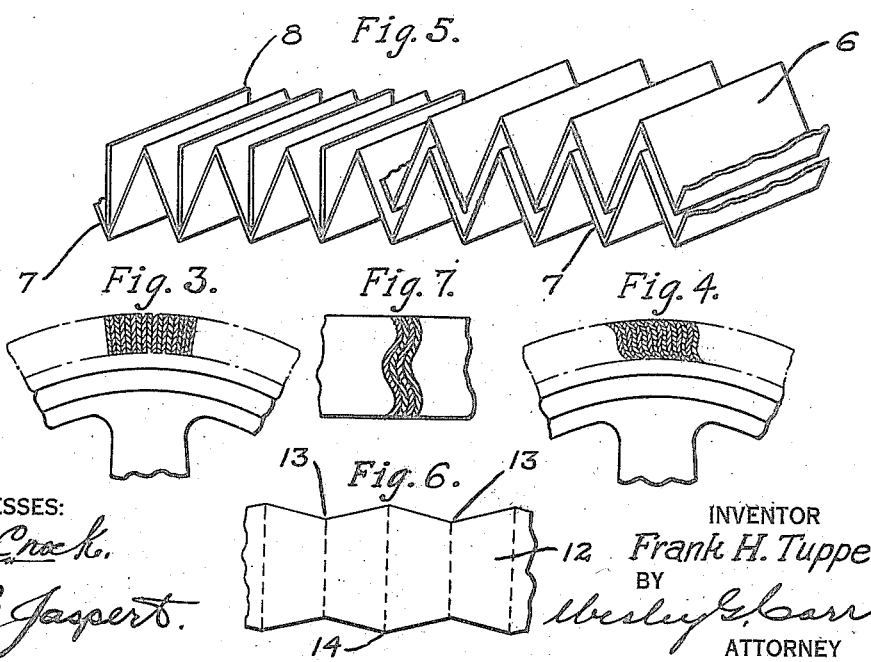
WITNESSES:
T. H. Crock.
W. B. Jaspert.
INVENTOR
Frank H. Tupper
BY
Wesley G. Carr
ATTORNEY

UNITED STATES PATENT OFFICE.

FRANK H. TUPPER, OF WILKINSBURG, PENNSYLVANIA, ASSIGNOR TO WESTINGHOUSE ELECTRIC & MANUFACTURING COMPANY, A CORPORATION OF PENNSYLVANIA.

MOLDED GEAR.

1,424,267.

Specification of Letters Patent.   Patented Aug. 1, 1922.

Application filed January 7, 1922. Serial No. 527,557.

*To all whom it may concern:*

Be it known that I, FRANK H. TUPPER, a citizen of the United States, and a resident of Wilkinsburg, in the county of Allegheny and State of Pennsylvania, have invented a new and useful Improvement in Molded Gears, of which the following is a specification.

My invention relates to composite gears, more especially to molded gears having metal centers or hubs and non-metallic working body portions.

It is among the objects of this invention to provide a method of forming composite gears which is economical, simple and readily adapted to manufacture in production quantities.

A further object of this invention is to provide a composite gear which is mechanically strong and durable and which will not disintegrate when operated in hot oil or when subjected to varying atmospheric and temperature changes.

Another object of my invention is to provide a gear structure in which the working body portion is so arranged as to provide maximum strength at the point of tooth contact.

It has been customary to form non-metallic gears of superposed layers of fibrous sheet material disposed and molded about a cast-iron center or hub. It has also been proposed to form the non-metallic working rim portion by spirally winding a relatively thin strip of material and superposing a plurality of such wound strips to form a rim of the desired thickness by compacting the assembled layers under heat and pressure to form a consolidated mass. In these structures, fibrous sheet material, such as fabric, paper, cotton, duck and wood laminations impregnated or coated with suitable binding materials, such as casein, albumen, blood glues, or a phenolic condensation product, have been employed.

In accordance with my present invention, I propose to form the non-metallic working body portion of a plurality of strips of fibrous sheet materials, such as those mentioned above, folded to form a plurality of superposed contiguous layers having the laminations radially disposed with respect to the metal center or hub. By means of this construction, the laminations are parallel to the profile of the teeth resulting in greater tooth strength, since it is obvious that any laminated material is stronger in the direction perpendicular to its laminations.

Another advantage of this folded rim construction is the economy resulting from employing a continuous strip of material in place of the punched or formed segments or laminations heretofore employed.

In the accompanying drawings constituting a part hereof in which like reference characters designate like parts.

Figure 1 is a top plan view of a gear formed in accordance with my invention showing the position of the folded strips relative to the tooth or working body portion;

Fig. 2 is a cross-sectional view taken on the line II—II of Fig. 1;

Fig. 3 is a diagrammatic view of a composite rim portion built up of fibrous laminations;

Fig. 4 is a similar view showing the laminations slightly distorted to break up the lines of cleavage;

Fig. 5 is a perspective view of a plurality of folded strips interposed prior to assembling them in the matrix of a mold;

Fig. 6 is a plan view of a wedge-shaped strip before folding; and

Fig. 7 is a top plan view of the strip (Fig. 6) after folding.

In the gear shown in Figures 1 and 2, I provide a metal hub or center 1 having a central opening 2 and a plurality of spokes 3. The hub member is provided with a knurled outer surface 4 and a rim 5 of suitable thickness to withstand the ordinary working stresses to which it is subjected. The hub member 1 is placed in the matrix of a mold (not shown) and a plurality of strips 6 and 7 (Fig. 5) of fibrous sheet material, such as fabric or paper, impregnated with a phenolic condensation product and folded transversely to form a plurality of superposed layers is disposed around the metal center 1 within the matrix.

The strip 6 is so folded that the folds will be disposed midway between the folds of the strip 7 to provide a greater density of the material near the outer periphery of the working portion to take care of the greater circumference of the gear blank near its outer periphery. In place of the inserted strip 6, individual laminations 8 may be inserted between the folds of the strip 7 to accomplish the same purpose, or these insertions 6 and 8 may be omitted entirely.

The mold is then closed by a pressure ring corresponding to the dimensions of the non-metallic working portion or rim, and the assembled structure is then inserted between a pair of heatable pressure platens of a hydraulic press. Heat and pressure are applied, which first fuses the binder, causing it to flow, and, by continued heating, the phenolic condensation product becomes hard and infusible, forming a solid homogeneous structure integral with the hub member 1. The gear thus formed may be machined in the usual manner by turning and facing the diameter 9 and sides 10, and the teeth 11 may be formed in the usual manner, as by cutting or generating.

As shown in Figs. 3 and 4, the non-metallic working body portion may be formed of a plurality of superposed laminations arranged radially around the rim 5 of the hub 1. The laminations may be distorted, as shown in Fig. 4, to avoid a straight line of cleavage, which is detrimental to the strength of the rim structure. The gear may also be formed by a folded strip 7, shown in Fig. 5, in combination with the individual laminations 8 which may be inserted between adjacent folds, thereby avoiding a direct line of cleavage parallel to the tooth profile.

A strip 12 (Fig. 6) having its edges notched to form alternate wide and narrow face widths when folded along the lines 13 and 14 to form a plurality of contiguous dovetail shaped layers may be employed in place of the straight-edge strips 6, 7 and 8.

This form of strip will be distorted in the molding operation, as shown in Fig. 7, in that the wide face portion will be displaced to fill in the less dense outer portion of the molded ring, and, in this manner, will function to break up the straight lines of cleavage formed by the straight-edge strips 6 and 7 and also tend to produce a more uniform density of the material.

It will be obvious from the above description of my invention that gears made in accordance therewith provide a rigid integral non-metallic working body portion sufficiently bonded or joined to the metal center or hub and that gears of this type may be applied to a great many machines wherein it is desirable to obtain silent gear operation at high speeds, such, for example, as the timing-gear train of internal-combustion engines.

Although I have described a specific embodiment of my invention, it will be obvious to those skilled in the art that various modifications may be made in the details of construction without departing from the principles herein set forth. For instance, instead of the knurled outer surface of the hub member 5, various other anchorages may be provided, such as V-shaped angular or dovetailed grooves, or the strips of fibrous sheet material may be folded in various ways to obtain the radial laminated feature.

I claim as my invention:

1. A composite gear comprising a metal center and a non-metallic working body portion of fibrous sheet material and a binder, said sheet material consisting of a strip folded so that the laminations are disposed radially to said center.

2. A composite gear comprising a metal center and a non-metallic working body portion of fibrous sheet material and a hardened binder, said sheet material consisting of a strip folded so that the laminations are disposed radially to said center.

3. A composite gear comprising a metal center and a non-metallic working body portion of fibrous sheet material and a heat-hardened binder, said sheet material consisting of a strip folded so that the laminations are disposed radially to said center.

4. A composite gear comprising a metal center and a non-metallic working body portion of fibrous sheet material and a phenolic condensation product, said sheet material consisting of a strip folded so that the laminations are disposed radially to said center.

5. A composite gear comprising a metal center and a non-metallic working body portion of fibrous sheet material and a binder, said sheet material consisting of a plurality of strips folded so that the laminations are disposed radially to said center.

6. A composite gear comprising a metal center and a non-metallic working body portion of fabric sheet material and a binder, said sheet material consisting of a strip folded so that the laminations are disposed radially to said center.

7. A composite gear comprising a metal center and a non-metallic working body portion of paper and a binder, said paper consisting of a strip folded so that the laminations are disposed radially to said center.

8. A composite gear comprising a metal center and a non-metallic working body portion of fibrous sheet material and a binder, said sheet material consisting of a plurality of strips folded so that some of said strips are disposed midway between the folds of other strips and so that the laminations will be radially disposed with respect to said center.

9. A composite gear comprising a metal center and a non-metallic working body portion of fibrous sheet material and a binder, said sheet material consisting of a plurality of strips folded so that one of said strips is disposed between portions of the folds of the adjacent strip near the outer periphery of the working body portion.

10. A method of forming a composite gear which comprises inserting a metal center in the matrix of a mold, disposing a plurality of folded strips of fibrous sheet material impregnated with a phenolic condensation product around said center with the folded laminations disposed radial to the center, placing a pressure plate on the assembled structure and simultaneously applying heat and pressure thereto to consolidate the mass.

11. A method of forming a composite gear which comprises inserting a metal center in the matrix of a mold, disposing a plurality of folded strips of fabric impregnated with a phenolic condensation product around said center with the folded laminations disposed radial to the center, placing a pressure plate on the assembled structure and simultaneously applying heat and pressure thereto to consolidate the mass.

12. A composite gear comprising a metal center and a non-metallic working body portion of fibrous sheet material and a binder, said sheet material consisting of an elongated strip having its sides notched to form a dovetail shape by folding along the successive notches disposed around said metal center so that the laminations will be radial with respect to the center.

In testimony whereof, I have hereunto subscribed my name this 29th day of December 1921.

FRANK H. TUPPER.